(12) United States Patent  (10) Patent No.: US 7,648,042 B2
Lee et al.  (45) Date of Patent: Jan. 19, 2010

(54) HIGH GAS-TIGHTENED METALLIC NOZZLE-BOSS FOR A HIGH PRESSURE COMPOSITE VESSEL

(75) Inventors: Joong-Hee Lee, Jeonju-Si (KR); Gye-Hyoung Yoo, Jeonju-Si (KR)

(73) Assignee: Korea Composite Research Co., Ltd., Kimje (KR)

( * ) Notice: Subject to any disclaimer, the term of this patent is extended or adjusted under 35 U.S.C. 154(b) by 610 days.

(21) Appl. No.: 10/598,496

(22) PCT Filed: Sep. 10, 2004

(86) PCT No.: PCT/KR2004/002319

§ 371 (c)(1),
(2), (4) Date: Aug. 31, 2006

(87) PCT Pub. No.: WO2005/093313

PCT Pub. Date: Oct. 6, 2005

(65) Prior Publication Data

US 2007/0164561 A1 Jul. 19, 2007

(30) Foreign Application Priority Data

Mar. 11, 2004 (KR) .......................... 10-2004-0016341

(51) Int. Cl.
*B65D 6/40* (2006.01)
*F17C 13/06* (2006.01)

(52) U.S. Cl. ........................................ 220/601; 220/582

(58) Field of Classification Search ................. 215/349, 215/346, 341, 200; 220/601, 661; 206/0.6; *F17C 13/06, F17C 1/16, 1/00*
See application file for complete search history.

(56) References Cited

U.S. PATENT DOCUMENTS 1,732,235 A * 10/1929 Joyce .......................... 220/240

(Continued)

FOREIGN PATENT DOCUMENTS

JP 07158797 A * 6/1995

(Continued)

*Primary Examiner*—Anthony Stashick
*Assistant Examiner*—Robert J Hicks
(74) *Attorney, Agent, or Firm*—Egbert Law Offices PLLC

(57) ABSTRACT

The present invention relates to a metal nozzle boss provided with a sealing device, which has highly improved tightness and is combined with a plastic liner of a composite vessel used as a high-pressure vessel. The metal nozzle boss uses an elastic seal ring and a tightening piece in the plastic liner, so that the nozzle boss reliably seals the junction of the nozzle boss and the liner and prevents gas leakage from the vessel. The blade part of the nozzle boss has a dovetail-shaped locking groove, with locking ridges formed in the locking groove. Thus, when the plastic liner is produced by injecting molten resin into the locking groove, the plastic liner is securely combined with the metal nozzle boss. The composite vessel having the metal nozzle boss can be used as a fuel tank for natural gas vehicles or a hydrogen tank for fuel cell vehicles.

3 Claims, 4 Drawing Sheets

U.S. PATENT DOCUMENTS

| | | | |
|---|---|---|---|
| 2,784,865 A * | 3/1957 | Rieke | 220/258.5 |
| 2,995,009 A * | 8/1961 | Rush | 60/721 |
| 3,557,827 A * | 1/1971 | Marsh | 137/590 |
| 5,429,845 A * | 7/1995 | Newhouse et al. | 428/34.1 |
| 5,577,776 A * | 11/1996 | Welch | 285/55 |
| 5,839,600 A * | 11/1998 | Moreira et al. | 220/560.04 |
| 2002/0125205 A1* | 9/2002 | Hathaway et al. | 215/356 |
| 2006/0102631 A1* | 5/2006 | Kraus | 220/304 |

FOREIGN PATENT DOCUMENTS

| | | | |
|---|---|---|---|
| JP | 10332084 A | * | 12/1998 |
| JP | 10332085 A | * | 12/1998 |
| KR | 10-0247116 | | 9/1999 |
| KR | 2003-0041002 | | 5/2003 |

* cited by examiner

HIGH GAS-TIGHTENED METALLIC NOZZLE-BOSS FOR A HIGH PRESSURE COMPOSITE VESSEL

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a metal nozzle boss which is combined with a plastic liner of a composite vessel preferably used as a high-pressure vessel.

2. Description of Related Art Including Information Disclosed Under 37 CFR 1.97 and 37 CFR 1.98.

In recent years, to produce a high-pressure composite vessel, preferably used as a fuel tank of natural gas vehicles or a hydrogen tank of fuel cell vehicles, a plastic liner must be first shaped using polymer resin, such as HDPE (high density polyethylene). Thereafter, carbon fiber or glass fiber, impregnated with thermosetting polymer resin, such as epoxy resin, is wound around the plastic liner, thus providing a light high-pressure composite vessel. During the process of producing the light high-pressure composite vessel, a metal nozzle boss is inserted into an end of the plastic liner and is combined with the end of the liner, so that a regulator or valve can be coupled to the end of the high-pressure vessel by means of the nozzle boss.

In the related art, a heavy high-pressure composite vessel, comprising a metal liner and carbon fiber or glass fiber impregnated with thermosetting polymer resin and wound around the metal liner, has been proposed and used. However, in recent years, to produce a light high-pressure vessel which can reduce the time required to inject gas into the high-pressure vessel, a high density polyethylene plastic liner is shaped through injection molding or rotary molding and, thereafter, carbon fiber or glass fiber, impregnated with epoxy resin or polyester resin, is wound around the plastic liner, thus providing a light high-pressure vessel. The conventional composite vessel having a metal liner is problematic in that the vessel is heavy, easily corroded and has increased production cost. However, the composite vessel having a plastic liner is advantageous in that the vessel is light and can effectively resist corrosion and fatigue caused by repeated injections of gas into the vessel, and the vessel reduces the time required to inject gas into the vessel. Thus, in recent years, various composite vessels having plastic liners have been actively studied and proposed. However, the composite vessels using plastic liners are problematic in that adhesion strength at the junction between the plastic liner and the metal nozzle boss is reduced.

In an effort to overcome the above-mentioned problem of reduced adhesion strength, Korean Patent Laid-open Publication No. 2003-0041002 (Laid-open Publication Date: May 23, 2003) discloses a method of securely combining a metal nozzle boss with a plastic liner of a composite vessel by providing a fine uneven surface on a predetermined surface of the metal nozzle boss, by treating the uneven surface of the nozzle boss using a plasma, by coating a thermosetting adhesive on the plasma-treated uneven surface, and thereafter, by forming a plastic liner combined with the metal nozzle boss through an injection molding process in which the metal nozzle boss is heated and inserted into the cavity of a mold and placed at a predetermined position in the cavity prior to injecting resin into the cavity.

Furthermore, when a metal liner is used in a composite vessel, the metal liner is integrated with a metal nozzle boss so that gas does not leak through the junction between the metal liner and the metal nozzle boss. However, when a plastic liner is used in a composite vessel, gas may leak through the junction of the metal liner and the metal nozzle boss due to delamination of the junction. The delamination of the junction between the metal liner and the metal nozzle boss of a conventional composite vessel is caused by the low surface energy of the plastic liner or by a reduction in elasticity of the plastic liner material due to repeated injections of gas into the vessel over a lengthy period of time. In the prior art, to prevent the gas leakage through the junction between the plastic liner and the metal nozzle boss of the conventional composite vessel, the junction may be chemically processed or may be coated with an adhesive, or the metal nozzle boss may be physically configured such that the boss can be securely combined with the plastic liner.

BACKGROUND ART

Korean Patent Publication No. 10-0247116 (Registration Date: Dec. 9, 1999) discloses a method of combining a metal nozzle boss with a plastic liner of a composite vessel using a plastic tightening piece. However, the above-mentioned method requires a difficult process of placing a plastic tightening piece in the plastic liner at a position under the nozzle boss and forms a weak structure at the junction between the tightening piece and the plastic liner, thus causing gas to leak through the weak junction of the tightening piece and the plastic liner.

Furthermore, the junction between the metal nozzle boss and the plastic liner may be delaminated when the composite vessel has been repeatedly used over a lengthy period of time, so that gas may leak through the delaminated junction. Thus, it has been necessary to provide a nozzle boss for high-pressure composite vessels, which can prevent gas leakage through the junction between the nozzle boss and the plastic liner even after the vessel has been repeatedly used over a lengthy period of time.

BRIEF SUMMARY OF THE INVENTION

Accordingly, an object of the present invention is to provide a metal nozzle boss which is inserted into and combined with a plastic liner of a composite vessel and which is configured such that the nozzle boss prevents gas leakage through the junction between the metal nozzle boss and the plastic liner.

The metal nozzle boss of the present invention uses both a seal ring made of an elastic material, such as rubber or silicone, and a tubular tightening piece in the plastic liner of the composite vessel, so that, even after the composite vessel has been repeatedly used over a lengthy period of time, gas does not leak through the junction between the nozzle boss and the liner.

The inventors have completed the invention after repeating pressure tests for conventional composite vessels manufactured using general metal nozzle bosses and composite vessels of the present invention which have metal nozzle bosses provided with sealing devices using both seal rings and tubular tightening pieces. The above-mentioned pressure tests demonstrated that the composite vessels having the metal nozzle bosses provided with the sealing devices do not allow gas to leak from the vessels even after the vessels have been repeatedly used over a lengthy period of time.

DETAILED DESCRIPTION OF THE INVENTION

The present invention relates to a metal nozzle boss combined with a plastic liner of a composite vessel which is preferably used as a high-pressure vessel and, more particularly, to a metal nozzle boss which has a sealing device to improve the tightness of the junction between the metal nozzle boss and the plastic liner.

Figure 1:
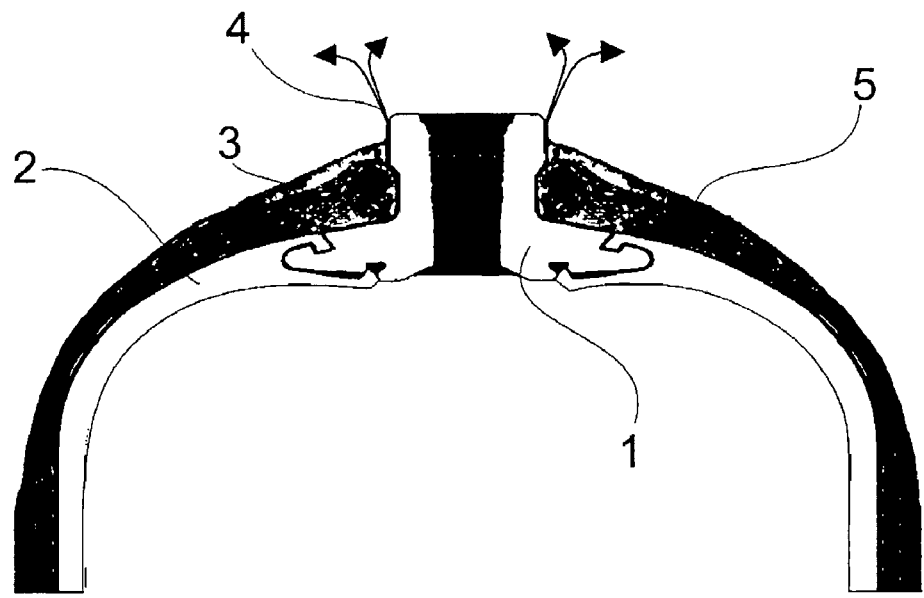
FIG. 1 is a sectional view illustrating gas leakage through the junction between a metal nozzle boss and a plastic liner of a conventional composite vessel.

FIG. 1 is a view illustrating a portion around a nozzle boss of a conventional composite vessel. This drawing shows gas leakage 4 through a delaminated junction 3 between the metal nozzle boss 1 and the plastic liner 2 of the conventional composite vessel. In FIG. 1, the arrow "→" shows a gas leaking direction. In general, the surface of a plastic product has low surface energy, so that the plastic surface has reduced adhesive power and reduced wetting power. Particularly, the adhesive power of a plastic surface relative to a metal surface is very low and, when molten resin meets a metal surface, the adhesive power of the plastic surface relative to the metal surface is further reduced. Thus, in an effort to overcome the problem, the metal surface may be chemically processed to increase its adhesive power or may be appropriately configured such that the metal surface can be physically and securely combined with a plastic surface. However, the above-mentioned chemical process or physical configuration of the metal surface cannot prevent gas leakage from the vessel caused by the delamination of the junction between the metal surface and the plastic surface due to repeated injections of gas into the vessel over a lengthy period of time. Thus, it is necessary to provide an additional means for mitigating the delamination of the junction.

Figure 2:
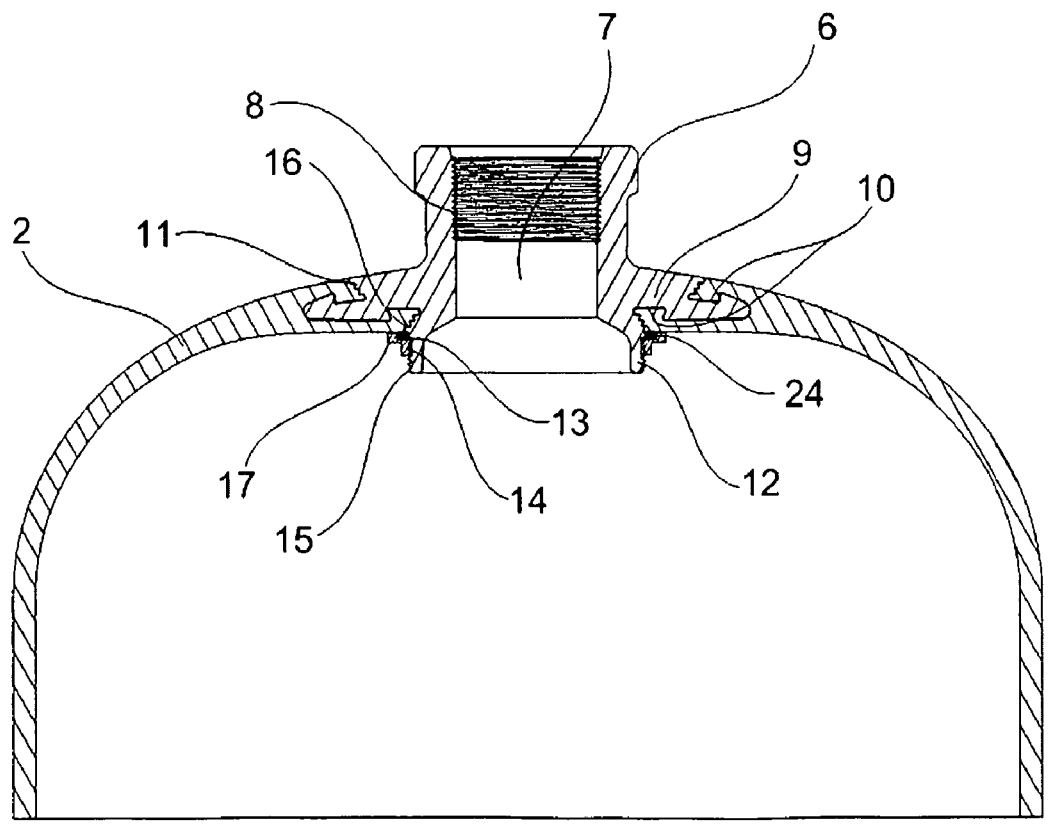
FIG. 2 is a sectional view illustrating a plastic liner having a metal nozzle boss combined with the plastic liner, according to the present invention.

The metal nozzle boss according to the present invention includes a sealing device using both a seal ring and a tightening piece in an effort to prevent gas leakage through the junction between a nozzle boss and a plastic liner of a conventional composite vessel. Described in detail, as shown in FIG. 2, the metal nozzle boss of the present invention comprises a cylindrical nozzle head part 6 which has both a vertical through hole 7 at a center thereof and an internal thread 8 formed on an upper portion of the inner circumferential surface of the vertical through hole 7, and a disc-shaped nozzle blade part 9 protruding outwards around the outside edge of the lower end of the nozzle head part 6. The metal nozzle boss further includes a sealing device 12 which is provided on a lower portion of the inner circumferential surface of the through hole 7.

Figure 3:
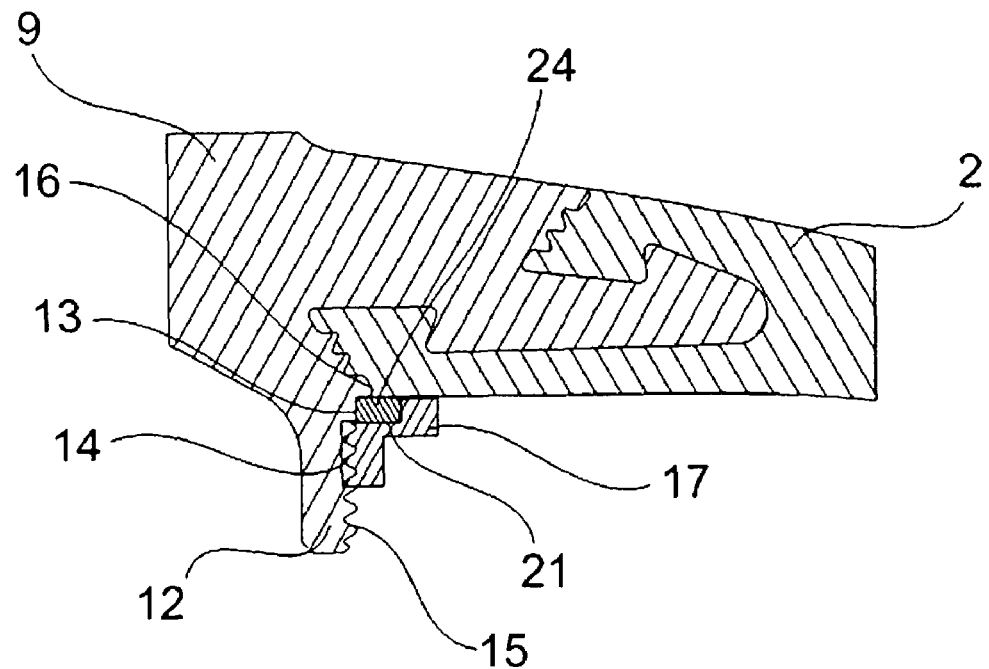
FIG. 3 is an enlarged sectional view illustrating a sealing device provided at the junction of the plastic liner and the metal nozzle boss of FIG. 2.

FIG. 3 is an enlarged view illustrating the sealing device 12. The sealing device 12 comprises a seal ring mounting part 13 to hold a seal ring 24 thereon, an external tightening thread 15 to engage with the tightening piece 17, and a tightening land 14 to apply predetermined constant pressure to the tightening piece 17, thus providing a desired sealing effect. The seal ring mounting part 13 is a ring-shaped surface provided on a multi-stepped support rim 16. A seal ring 24 is fitted over the seal ring mounting part 13 and is compressed by the tightening piece 17, thus sealing the junction between the metal nozzle boss 1 and the plastic liner 2. In the above state, the seal ring 24, which is fitted over the seal ring mounting part 13, is compressed by the tightening piece 17, thus being deformed in a depressed seal ring seat 21 of the tightening piece 17 and coming into close contact with the junction between the nozzle boss 1 and the liner 2. Thus, the seal ring 24 closes a gas leaking passage.

The sealing effect provided by the tightening piece 17 of the sealing device 12 is accomplished as follows. After the tightening piece 17 initially engages with the external tightening thread 15, the tightening piece 17 is rotated to be moved upwards along the sealing device 12 until the tightening piece 17 compresses the seal ring 24. In the above state, the tightening piece 17 is rotated and moved upwards along the external tightening thread 15 and, thereafter, disengages from the thread 15 so that the tightening piece 17 is placed around the tightening land 14. When the tightening piece 17 is placed around the tightening land 14, the tightening piece 17 compresses the seal ring 24 with a predetermined constant force, so that the compressed seal ring 24 is deformed in the depressed seal ring seat 21 of the tightening piece 17 and comes into close contact with the junction between the nozzle boss 1 and the liner 2. Thus, the compressed seal ring 24 closes a gas leaking passage, through which gas may leak from the vessel, thus increasing the tightness of the plastic liner 2. The tightening land 14 is provided between the seal ring mounting part 13 and the external tightening thread 15 and has a cylindrical surface similar to the surface of the seal ring mounting part 13.

The tightening land 14 has a diameter equal to or less than the diameter of the seal ring mounting part 13, and equal to or less than the diameter of a root of the external tightening thread 15. Due to the above-mentioned size of the tightening land 14, the tightening land 14 can cooperate with the external tightening thread 15 and allows the tightening piece 17 to apply a predetermined compression force to the seal ring 24. In other words, the tightening land 14 is machined by a strain from the seal ring 24 to be compressed so that the tightening piece 17, in conjunction with both the tightening land 14 and the external tightening thread 15, can apply a predetermined compression force to the seal ring 24 without requiring a separate tool. Described in detail, when the seal ring 24 is compressed by the tightening piece 17, the compression force of the tightening piece 17 for the seal ring 24 is determined by both the material and the strain from the seal ring 24. If the tightening piece 17 repeatedly becomes disengaged from the external tightening thread 15 at an unchanged predetermined position, the compression strain to compress the seal ring 24 becomes constant so that the tightening piece 17 can apply a constant compression force to the seal ring 24. Thus, it is possible to strongly tighten the tightening piece 17 without using a separate tool, such as a torque wrench. Furthermore, because the tightening land 14 allows the inner pressure of the vessel to equally act on the inside and outside of the seal ring 24, the seal ring 24 can be prevented from being biased in one direction.

Figure 4:
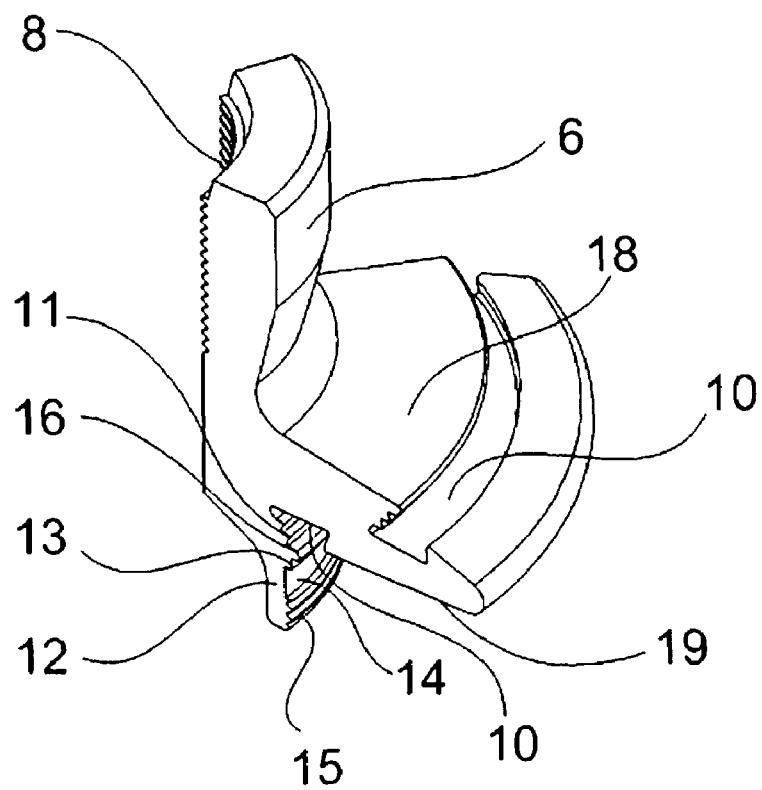
FIG. 4 is a partial perspective view of a part of the metal nozzle boss, on which the sealing device is provided, according to the present invention.
Figure 5:
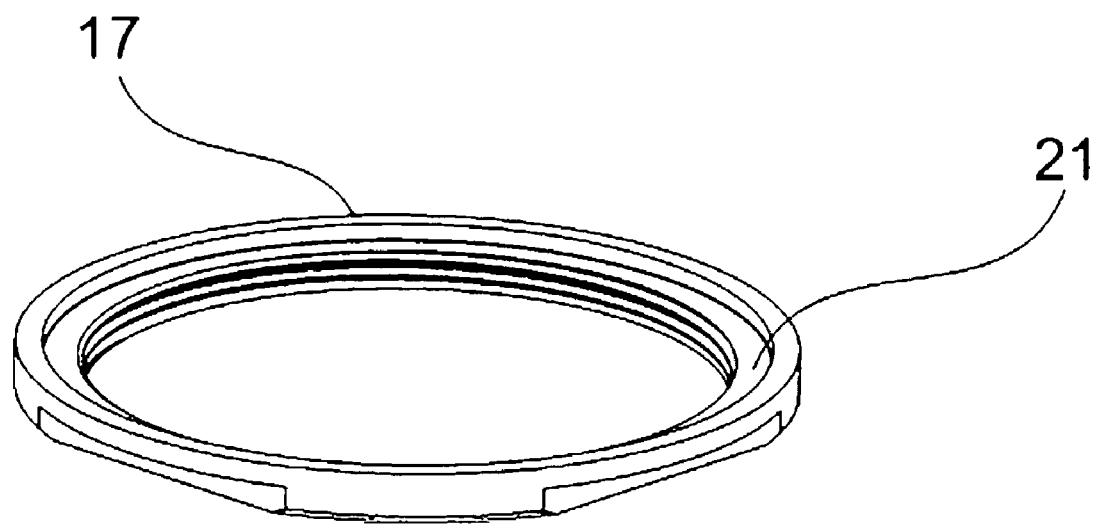
FIG. 5 is a perspective view of a tubular tightening piece which is tightened to the sealing device of the metal nozzle boss according to the present invention.

FIG. 4 is an enlarged perspective view of the metal nozzle boss 1 of the present invention. As shown in the drawing, each of an upper sloping surface 18 and a lower sloping surface 19 of the disc-shaped nozzle blade part 9 is provided with a locking groove 10 which has a dovetail cross-section and a plurality of locking ridges 11. Described in detail, the locking ridges 11 are formed on an inclined surface of the dovetail-shaped locking groove 10. Thereafter, molten plastic resin is injected into the locking groove 10 having the locking ridges 11 and is hardened in the groove 10. Thus, the contact surface between the metal nozzle boss 1 and the plastic liner 2 is increased and allows the metal nozzle boss 1 to be securely combined with the plastic liner 2. Furthermore, while gas is injected into the composite vessel, the nozzle boss 1 disperses the direction of load acting on the junction surface between the nozzle boss 1 and the plastic liner 2, thus minimizing delamination of the junction surface between the metal nozzle boss 1 and the plastic liner 2.

Figure 6:
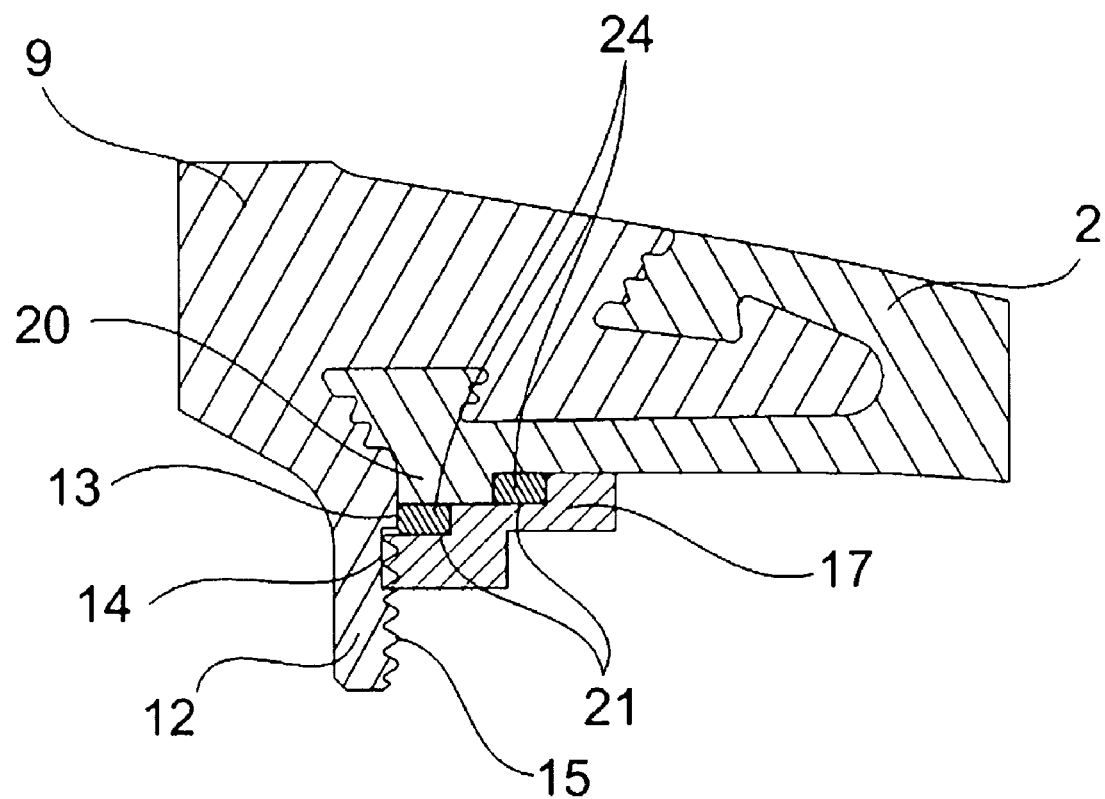
FIG. 6 is a sectional view illustrating a sealing device, having seal rings respectively installed on a liner protrusion and a seal ring mounting part according to another embodiment of the present invention.

As shown in FIG. 6, the sealing device 12 of the present invention maybe variously embodied according to the shape and position of the seal ring mounting part 13. FIG. 6 shows an embodiment in which a liner protrusion 20 is formed around a multi-stepped support rim 16 of a metal nozzle boss 1. In this embodiment, the sealing device 12 comprises two seal rings 24 which are respectively installed on the liner protrusion 20 and the seal ring mounting part 13 of the nozzle boss 1, so that the seal rings 24 more efficiently close a gas leaking passage of the vessel.

The seal ring 24 of the present invention may have a circular or polygonal cross-section and may be made of rubber, silicone or soft plastic.

Figure 7:
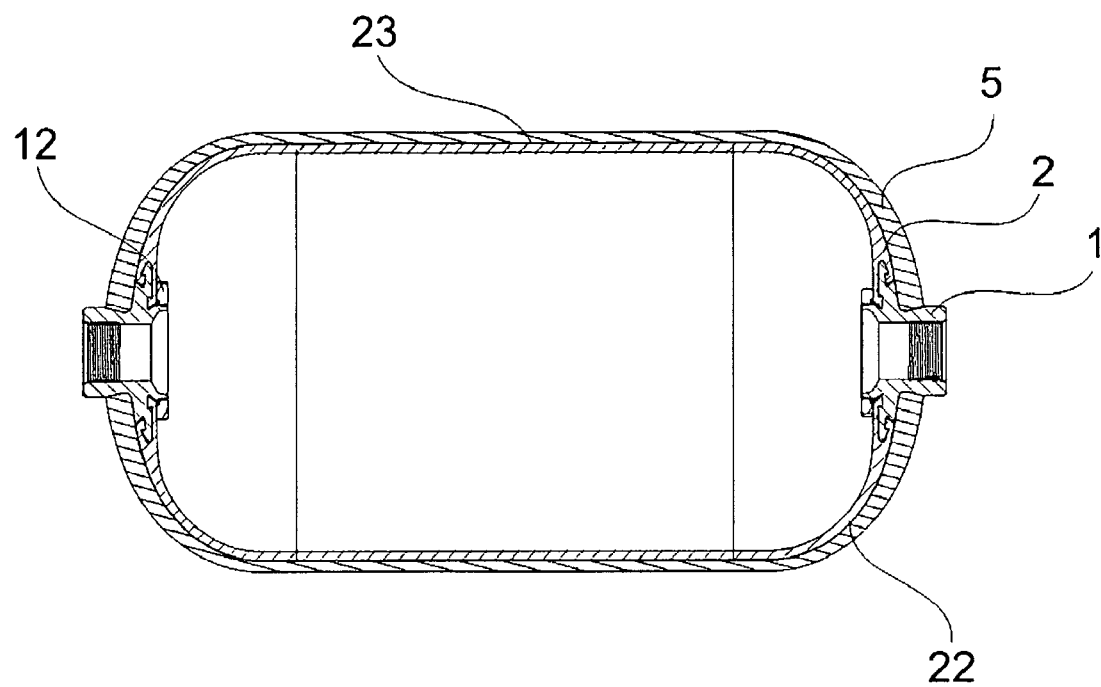
FIG. 7 is a sectional view of a composite vessel having a metal nozzle boss according to the present invention.

FIG. 7 is a sectional view of a composite vessel having a metal nozzle boss according to the present invention. As shown in the drawing, to produce the composite vessel of the present invention, a metal nozzle boss 1 is machined using a cutting machine. Thereafter, an insert injection molding process is executed with the machined nozzle boss 1 inserted in the cavity of an injection mold, so that a dome 22 is provided. After the dome 22 has been provided, a sealing device comprising both a seal ring 24 and a tightening piece 17 is installed at a predetermined position in the dome 22, so that the tightness of the dome 22 is increased. Furthermore, a cylinder part 23 is produced through an extrusion process and, thereafter, a cutting process is executed to provide a desirably sized cylinder part. Two domes 22 are integrated with opposite ends of the cylinder part 23 into a single body through a thermal welding process, thus providing a liner to be used as a core in a filament winding process. After producing the line, carbon fiber impregnated with epoxy resin is wound around the liner and is hardened to form a composite layer 5, thus producing a desired high-pressure composite vessel.

Figure 8:
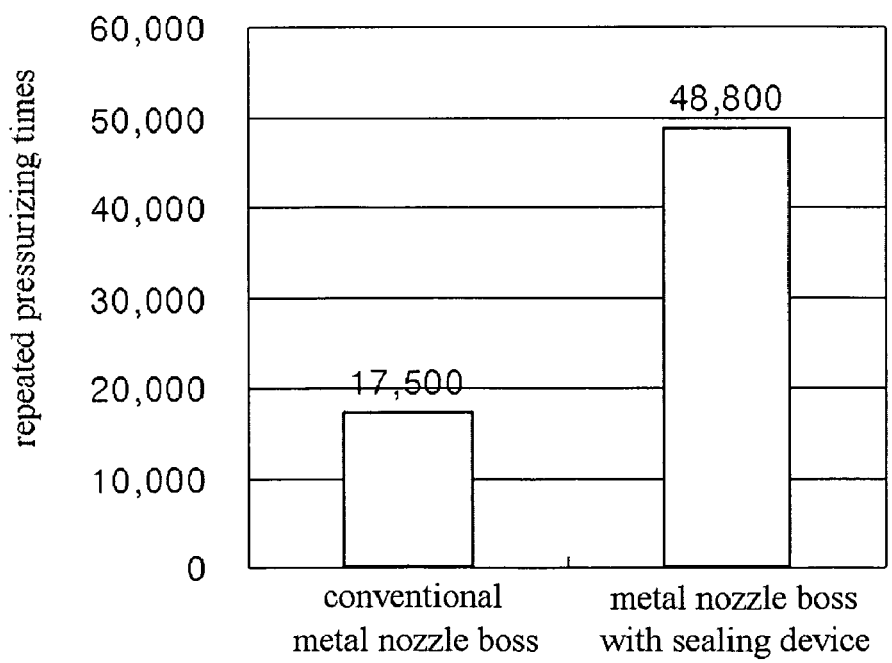
FIG. 8 is a graph illustration comparatively showing the durability of a composite vessel having the metal nozzle boss according to the present invention, in comparison with a composite vessel having a conventional metal nozzle boss.

Pressure tests showed that the high-pressure composite vessel, having the metal nozzle boss 1 proposed in the present invention, solved the problem of conventional high-pressure composite vessels in which gas may leak through the junction between the metal nozzle boss 1 and the plastic liner 2, even though the high-pressure composite vessel of the present invention was repeatedly filled with gas in the plastic liner 2 over a lengthy period of time. FIG. 8 is a graph of pressure tests repeated at room temperature according to ISO 11439. During the pressure tests repeated at room temperature, water was fully contained in a composite vessel and, thereafter, pressure from 20 bar to 260 bar was repeatedly applied to the vessel. After the pressure tests, gas leakage tests were conducted on the pressure-tested vessels, thus determining whether gas leaked from the vessels or not. Thereafter, durability of the composite vessels was tested. As shown in FIG. 8, the composite vessel having the metal nozzle boss, provided with the sealing device according to the present invention, leaked gas after the vessel had been repeatedly pressurized 48800 times. This means that the durability of the composite vessel of the present invention is increased to 2.8 times that of the composite vessel having the conventional metal nozzle boss. Thus, the present invention provides a composite vessel which has an expected life span increased two or more times in comparison with conventional composite vessels by increasing the tightness of the composite vessel through the above-mentioned manner.

ADVANTAGEOUS EFFECTS

The present invention uses a highly gas-tight metal nozzle boss in a high-pressure composite vessel so that the present invention prevents gas leakage from the vessel through the junction between a plastic liner and the metal nozzle boss even after the vessel has been repeatedly used over a lengthy period of time. Furthermore, the composite vessel of the present invention can retain desired tightness even if the vessel is repeatedly subjected to fatigue load, such as caused by repeated injections of gas into the vessel, so that the present invention provides a composite vessel having high durability and high tightness.

We claim:

1. A metal nozzle boss for high-pressure composite vessels, said metal nozzle boss for use with a plastic liner of high-pressure composite vessels, said metal nozzle boss comprising:

a cylindrical nozzle head part having a vertical through hole and an internal thread formed on an upper portion of an inner circumferential surface of said vertical through hole;

a disc-shaped nozzle blade part protruding outwards around an outside edge of a lower end of the nozzle head part, the nozzle blade part having an upper sloping surface and a lower sloping surface respectively provided on an upper surface and a lower surface of the nozzle blade part;

a seal ring mounting part depressed into a lower surface of a multi-stepped support rim which protrudes upwards and outwards from an outer circumferential surface of the nozzle head part at a position below the lower sloping surface;

a sealing device extending downwards from said seal ring mounting part and having both an external tightening thread formed around a lower portion of an outer circumferential surface of said sealing device and a tightening land formed between an upper end of said external tightening thread and said seal ring mounting part, said tightening land having a diameter equal to a diameter of a root of said external tightening thread;

a tubular tightening piece having an internal tightening thread and engaging with said external tightening thread such that an upper surface of the tightening piece comes into contact with an inner surface of said plastic liner, with a depressed seal ring seat provided on said upper surface of the tightening piece at a position corresponding to a junction with said plastic liner; and a seal ring seated in the seal ring seat of the tightening piece such that a lower surface of said seal ring comes into close contact with the seat, a first surface thereof coming into close contact with said seal ring mounting part, a second surface thereof coming into contact with the plastic liner.

2. The metal nozzle boss for high-pressure composite vessels according to claim 1, wherein each of said upper sloping surface and said lower sloping surface is provided with a locking groove having a dovetail cross-section, with a plurality of locking ridges formed on an inclined surface of the locking groove.

3. The metal nozzle boss for high-pressure composite vessels according to claim 1, wherein said seal ring has a circular or polygonal cross-section and is comprised of rubber, silicone or soft plastic.

* * * * *